M. H. TALLMAN.
OCULARY TESTING CHART.
APPLICATION FILED MAY 1, 1920.

1,412,902. Patented Apr. 18, 1922.

Inventor
Malcolm H. Tallman
Attorney

UNITED STATES PATENT OFFICE.

MALCOLM H. TALLMAN, OF ASTORIA, NEW YORK.

OCULARY TESTING CHART.

1,412,902. Specification of Letters Patent. Patented Apr. 18, 1922.

Application filed May 1, 1920. Serial No. 378,073.

*To all whom it may concern:*

Be it known that I, MALCOLM H. TALLMAN, a citizen of the United States, and resident of Astoria, county of Queens, State of New York, have invented certain new and useful Improvements in Oculary Testing Charts, of which the following is a specification.

One of the objects of my invention is to provide a chart having letters or characters thereon for testing the acuity of vision which can be viewed and identified either directly or indirectly by reflection.

Another object is to provide a chart having characters or letters thereon which can be inverted without losing their identity. A further object is to provide a chart having characters thereon which can be either viewed directly or indirectly by reflection in a mirror and inverted for either direct or indirect observation and yet be identifiable alphabetic or numerical characters. Other objects will be apparent from the following specification and subjoined claims when read in connection with the accompanying drawings in which:—

Fig. 1 is a chart illustrating one form of the invention;

Fig. 1ª is a view showing the chart of Fig. 1 as viewed indirectly in a mirror;

Fig. 2 is a view of a chart having invertible characters;

Fig. 2ª is a view of the chart of Fig. 2 inverted;

Figure 4:
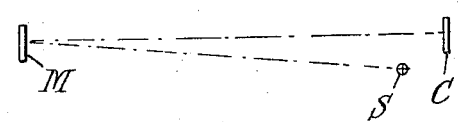
Fig. 4 is a diagram of a testing range.

For testing the vision of a person it is desirable to have the focal distance from the eyes to the testing chart approximately twenty feet, which necessitates the use of a room over twenty in length for direct vision. By use of a mirror M, Fig. 4, a much smaller room can be used and still the long focal distance obtained through reflection, the chart C being placed at the rear of the spectator S as diagrammatically illustrated. Heretofore in oculary charts for use with reflecting mirrors it has been the practice to print the letters or characters in reverse formation so that they will present an identifiable character when reflected in a mirror. This necessitates special engraving and tends to make such charts comparatively expensive, and such charts can only be used in indirect testing by reflection.

My improved chart can be used for either direct or indirect testing as the characters delineated thereon can be oriented in different ways changing their perspective value.

Figure 1:
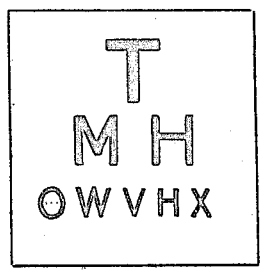
Figure 1A:
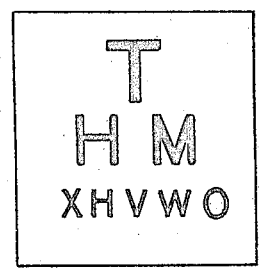

The chart of Fig. 1 having the letters

T
M H
O W V H X thereon can be used for direct testing or for indirect testing in connection with a mirror or other reflector in which case it will appear to the spectator as shown in Fig. 1ª.

In some cases it is advisable to present the letters in different order to prevent the spectator from memorizing the characters as has been done in examinations of army recruits and railroad men. The chart of Fig. 2 serves well for such purposes as it can be inverted so as to appear as shown in Fig. 2ª to change the location and order of succession of the characters.

Figure 3:
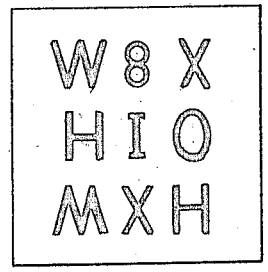
Fig. 3 is a view of a chart which can be viewed either directly or indirectly by reflection; inverted, or inverted and viewed indirectly by reflection and in all such cases present identifiable letters or numerals; as indicated in Figs. 3ª, 3ᵇ and 3ᶜ.
Figure 3A:
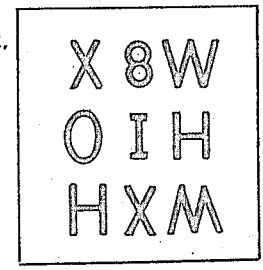
Figure 3B:
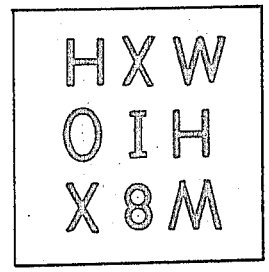
Figure 3C:
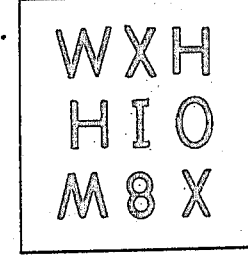

A more complex chart is shown in Fig. 3. It can be used for direct visual testing or for indirect testing by reflection in which case it will appear to the observer as shown in Fig. 3ª. This chart may be inverted as shown in Fig. 3ᵇ for direct testing or inverted and used in indirect testing with a reflector in which case the characters will appear to the spectator as shown in Fig. 3ᶜ.

It will be seen that the characters on the chart of Fig. 1 are all symmetrical about a vertical axis and therefor do not change their appearance when viewed in a mirror.

Figure 2:
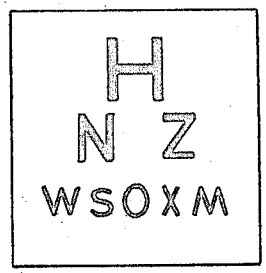
Figure 2A:
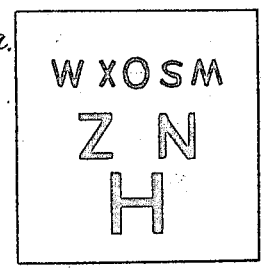

The letters N, S and Z on the chart of Fig. 2 are of such formation that they appear substantially the same when inverted as in Fig. 2ª, the letters H, O and X being symmetrical about a horizontal axis do not change when inverted. The letters W and M when inverted become M and W.

It will be seen that the chart of Fig. 3 includes the letters W and M which are reversible and invertible as above explained. All the other letters on this chart are symmetrical about both their vertical and horizontal axes and can therefore be either inverted or viewed indirectly in a mirror without losing their identity.

The characters in the different rows on the charts can be of graduated size similar to those illustrated in Figs. 1 and 2, or all substantially the same size as in Fig. 3. They may be printed on a plain opaque background of a contrasting color or may be coated with a luminous material so as to be visible in a dark room. In some instances they will be transparent characters on an opaque glass or similar background or opaque characters on a transparent background. It is to be noted that transparent charts like Fig. 1 and Fig. 3 can be viewed from either side as will be apparent by holding the drawing up to the light with the obverse side toward the spectator. Where transparencies are used a light may be placed behind the chart to make the characters stand out.

Though I have described in detail the embodiments of the invention shown, it is not to be understood therefrom that I am limited thereto and the above description and the drawings are to be interpreted in an illustrative rather than a limiting sense.

Having thus described my invention what I claim is:

1. A chart for testing the acuity of vision having a plurality of rows of characters thereon, the characters being alphabetic or numerical ones of such formation that they can be read either directly or indirectly by reflection, said chart being adapted to be inverted so that the order of succession of the characters will be varied.

2. A chart for testing the acuity of vision having a plurality of rows of characters thereon, the characters being alphabetic or numerical ones which are symmetrical about their horizontal and vertical axes so that the chart can be inverted to present identifiable readable characters in a different order of succession.

3. A chart for testing the acuity of vision having a plurality of rows each row comprising a character or a plurality of characters, and those in each row being of different sizes and of such formation that the chart can be inverted to vary the order of succession of the characters and yet present readable alphabetic letters.

In witness whereof, I have hereunto signed my name.

MALCOLM H. TALLMAN.